United States Patent
Splinter et al.

(10) Patent No.: US 9,637,252 B2
(45) Date of Patent: May 2, 2017

(54) SEALANT PACKAGING AND METHOD

(71) Applicant: Right/Pointe, LLC, DeKalb, IL (US)

(72) Inventors: Thomas D. Splinter, Sun City Center, FL (US); Stephen Patrick Giersch, St. Charles, IL (US)

(73) Assignee: RIGHT/POINTE, LLC, Chicago, IL (US)

( * ) Notice: Subject to any disclaimer, the term of this patent is extended or adjusted under 35 U.S.C. 154(b) by 762 days.

(21) Appl. No.: 13/954,291

(22) Filed: Jul. 30, 2013

(65) Prior Publication Data

US 2014/0033650 A1    Feb. 6, 2014

Related U.S. Application Data

(60) Provisional application No. 61/678,490, filed on Aug. 1, 2012.

(51) Int. Cl.
| | |
|---|---|
| *B65B 63/08* | (2006.01) |
| *B65B 35/50* | (2006.01) |
| *B65B 3/04* | (2006.01) |
| *B65D 57/00* | (2006.01) |
| *B65D 71/00* | (2006.01) |
| *B29C 37/00* | (2006.01) |

(52) U.S. Cl.
CPC .............. *B65B 3/04* (2013.01); *B65B 63/08* (2013.01); *B29C 37/0075* (2013.01)

(58) Field of Classification Search
CPC ........... B65B 63/08; B65B 35/50; B65B 3/04; B65D 57/00

USPC .......................................................... 53/410
See application file for complete search history.

(56) References Cited

U.S. PATENT DOCUMENTS

| | | | | |
|---|---|---|---|---|
| 3,366,233 A | * | 1/1968 | Roediger | B32B 27/00 206/524.2 |
| 3,837,778 A | * | 9/1974 | Parker | B65B 63/08 206/524.7 |
| 4,335,560 A | * | 6/1982 | Robinson | B65B 63/08 53/440 |
| 4,932,528 A | * | 6/1990 | Benno | B65D 71/10 206/144 |
| 5,452,800 A | * | 9/1995 | Muir | B65B 63/08 206/447 |

(Continued)

*Primary Examiner* — Andrew M Tecco
*Assistant Examiner* — Praachi M Pathak
(74) *Attorney, Agent, or Firm* — Thomas E. Williams; Neal, Gerber & Eisenberg LLP

(57) ABSTRACT

An improved sealant packaging and method for use with sealing joints and cracks in pavement and parking lots is provided. Liquid sealant material is poured by volume into a container draped with a sheet. Container is cooled so that the sealant becomes a solid block, with the sheet adhered to the sides of the sealant block such that the sheet forms a container for the sealant. The sheet also acts a release liner for easily removing the sealant block from the container. Two or more contained blocks are stacked together, forming a package of two or more blocks self-sealed by sheets. When the package is placed in a melting kettle, heat migrates through the spaces between the individual sealant blocks and allows the smaller sealant blocks to melt quickly and evenly. Sheet and film melt with sealant material and are incorporated therein to form the final sealant product.

19 Claims, 5 Drawing Sheets

(56) References Cited

U.S. PATENT DOCUMENTS

| | | | |
|---|---|---|---|
| 6,230,890 B1* | 5/2001 | Waver | B65B 63/08 |
| | | | 206/447 |
| 6,362,257 B1* | 3/2002 | Chehovits | C08L 95/00 |
| | | | 106/217.8 |
| 6,966,723 B2* | 11/2005 | Zentner | E01C 11/005 |
| | | | 404/17 |
| 8,017,681 B2* | 9/2011 | Guymon | B65D 21/0223 |
| | | | 206/524.7 |
| 8,114,494 B2 | 2/2012 | Marchal | |
| 8,283,409 B2* | 10/2012 | Guymon | B65D 21/0223 |
| | | | 206/524.7 |
| 2009/0065560 A1* | 3/2009 | Johnson | B65D 5/4216 |
| | | | 229/103.2 |
| 2011/0253124 A1* | 10/2011 | Shea | E01C 23/206 |
| | | | 126/343.5 A |
| 2012/0292223 A1* | 11/2012 | Chenail | B65B 35/50 |
| | | | 206/524.1 |

\* cited by examiner

SEALANT PACKAGING AND METHOD

CROSS-REFERENCE

This application claims the benefit of U.S. Provisional Patent Application No. 61/678,490 filed on Aug. 1, 2012, which is incorporated herein in its entirety.

BACKGROUND

Sealants are used for the sealing of joints and cracks in concrete and asphaltic pavements and parking lots. It is known in the art to deliver packaged blocks of sealant material to a job site, which are then melted in a kettle on-site. The liquefied melted sealant is then used to seal joints and/or fill cracks in the pavement. It is also known in the art to use a material for the packaging that itself is an ingredient for including into the sealant product. Prior art which describes such a system is U.S. Pat. No. 8,017,681 to Guymon et al., which discloses adding a thermoplastic product to a foamed polymer container, the foamed polymer container being an ingredient in the sealant product such that the entire container and its contents can be placed in a kettle on the job site and melted. However, foamed polymer containers are expensive, and must be separately transported and stored in preparation for the sealant packaging process. Moreover, the foamed polymer container causes problems as it melts with the sealant in the kettle on-site. Also known is the use of less bulky polypropylene film as packaging, as described in U.S. Pat. No. 5,452,800 to Muir for use with roofing asphalt applications. In Muir, a mold with dimensions to produce a 50-pound asphalt block is lined with polypropylene film, liquid asphalt is poured into the lined mold, and the mold is cooled. When the asphalt is cooled to solid, the asphalt covered by the polypropylene film is removed, the film forming the packaging for the asphalt block which then melts with the asphalt is heated in the on-site vat. A portion of the top of each asphalt block is left uncovered by the film, such that when packages are stacked the top asphalt surface of a package will adhere to the bottom of an adjacent package. However, Muir does not disclose use of such a packaging method for joint sealant material. Moreover, Muir discloses forming a single, large block of asphalt material for melting on-site, which results in a slow melting time due to the required heating for a large solid block of material.

SUMMARY

The present invention solves the existing limitations. The present invention relates to an improved sealant packaging and method for use with the sealing of joints and cracks in concrete and asphaltic pavements and parking lots. In particular, the present invention provides a method of forming a package of two or more blocks of sealant, wherein multiple blocks of sealant are contained by a sheet of polypropylene and form a self-sealed package of multiple blocks for melting in a kettle on the job site. The polypropylene sheet acts as an inexpensive, easily stored container for the sealant, and can also be melted into the sealant mix at the job site. In a preferred embodiment, sealant material is liquid at pour temperature and is dispensed by volume into aluminum pans lined with a sheet of polypropylene or similar material. As the sealant fills the pan the sheet repositions itself against all open sides of the pan, with the sealant taking the shape of the pan. The filled pan is then cooled so that sealant becomes a solid block of material, covered on all sides except the top surface of the block by the polypropylene sheet such that the polypropylene sheet forms a container for the sealant. The polypropylene sheet also acts a release liner for easily removing the sealant blocks from the pan. A second block is formed in the same manner, and two or more contained blocks are then stacked together, with the open ends of two blocks placed adjacent to one another, and the open sides of any additional blocks placed on the bottom of the stack of two, forming a self-sealed package of two or more blocks. The package of two or more blocks is then sealed together with a film, such as by shrink-wrapping, and delivered to the job site. When the package is placed in a melting kettle, heat migrates through the spaces between the individual sealant blocks unlike prior systems which use a single, large block sealant material, and allows the smaller sealant blocks to melt more quickly and evenly in the kettle.

Other objects, advantages, features, properties and relationships of the invention will be obtained from the following detailed description and accompanying drawings which set forth illustrative embodiments that are indicative of the various ways in which the principles of the invention may be employed.

DETAILED DESCRIPTION

The description that follows describes, illustrates and exemplifies one or more embodiments of the present invention in accordance with its principles. This description is not provided to limit the invention to the embodiments described herein, but rather to explain and teach the principles of the invention in order to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

Figure 1:
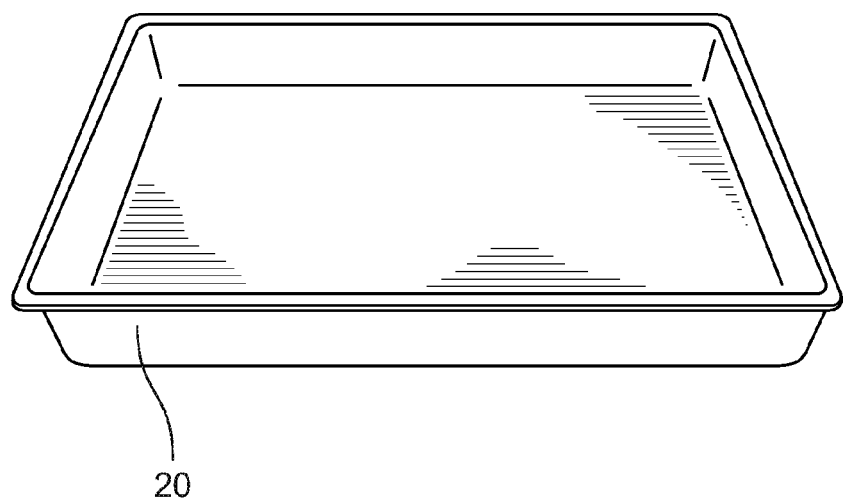
FIG. 1 is a top perspective view of a container for receiving a volume of sealant material in accordance with the present invention.

Referring now to the FIGS., a representative embodiment of the present invention is illustrated that includes a sealant product and packaging method therefore. In FIG. 1, a generally rectangular container 20, such as pan comprised of aluminum or similar material, is configured to receive a volume of sealant material 10. Sealant material 10 may comprise any suitable composition appropriate for filling cracks and joints in concrete and asphaltic pavements. One example of a suitable sealant material 10 is a petroleum asphalt, petroleum oil, thermoplastic polymer and limestone-based composition. Sealant material 10 is liquid at pour temperature such that it fills the volume and shape of pan 10 when poured into pan 20, and cools to a solid when cooled at or about 125° F. In a preferred embodiment, pan 20 is sized to create finished sealant blocks 10 weighing approximately 10 lbs. Exemplary dimensions of the pan 20 in this embodiment are 3"×14"×22". In this embodiment, three individual sealant blocks 10 are then self-sealed together (described below) to produce an approximately 30-lb package 50, which permits easy handling and also allows entire package 50 to fit into a melting kettle. Pan 20 can alternatively be sized to produce sealant blocks 10 of varying sizes, and, as a result, packages 50 comprised of varying numbers of sealant blocks 10 and having varying total weights.

Figure 2:
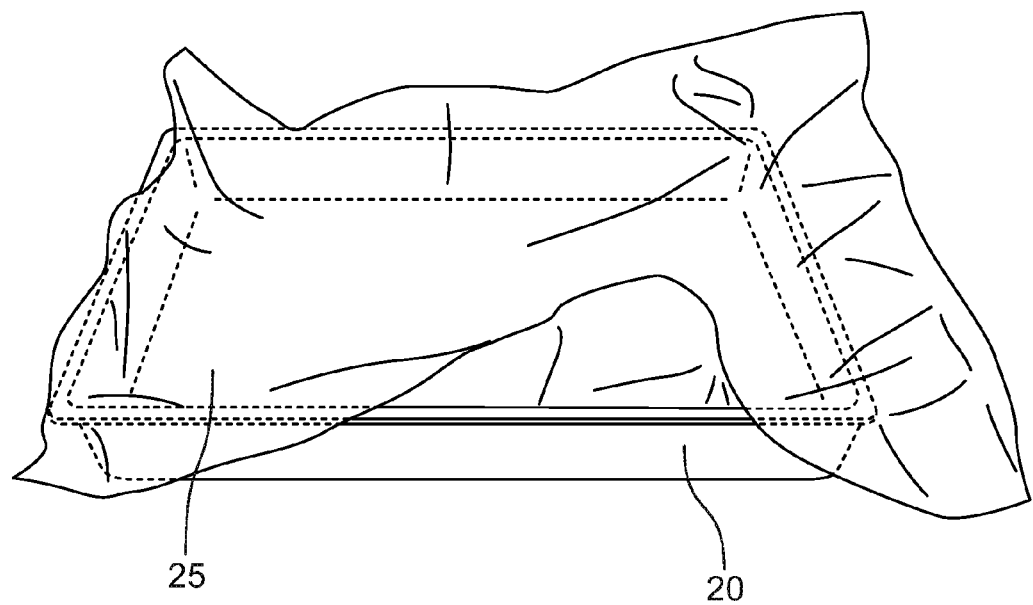
FIG. 2 is a top perspective view of a container lined with a sheet for receiving a volume of sealant material in accordance with the present invention.
Figure 3:
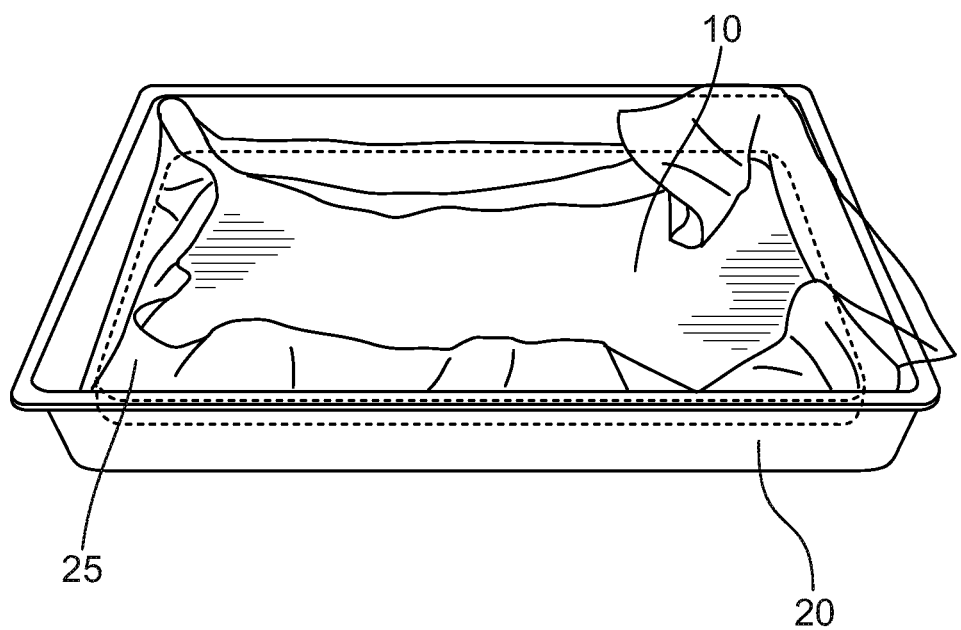
FIG. 3 is a top perspective view of a container lined with sheet and filled with sealant in accordance with the present invention.

As seen in FIG. 2, pan 20 is draped or lined with a sheet 25 of polypropylene or similar material. The sheet 25 acts as an inexpensive, easily stored flexible container for the sealant 10, and can also be melted into a liquid state along with sealant material 10 and incorporated into the sealant product for use at the job site. To form a block of sealant 10, liquid sealant 10 is poured into pan 20 over sheet 25. As seen in FIG. 3, as the sealant 10 fills the pan 20, the sheet 25 repositions itself against all sides of the pan 20. This repositioning is from the force of the sealant 10 self-leveling and taking the shape of the pan 20. Sealant material 10 is compatible with the sheet 25 material such that sheet 25 adheres to the sealant 10 after the sealant 10 is poured into pan 20. In a preferred embodiment, sheet 25 is comprised of extrusion grade polypropylene. As described below, sheet 25 will turn to liquid when packaged sealant product 50 is placed in a kettle on the job site, the sheet 25 forming part of the end product for filling cracks and joints. The polypropylene comprises approximately 0.2% of the joint sealant. Polypropylene is a long carbon chain with only methyl functional groups, and is very compatible with asphalt. There are no significant chemical reactions that take place between the polypropylene and other components of the joint sealant. When the polypropylene breaks down it merely becomes part of the filler in the sealant. In a preferred embodiment shown in FIG. 3, sheet 25 is sized such that when sealant 10 fills the pan 20 and repositions sheet 25, sheet 25 covers all sides of the sealant 10 and a portion of the top surface of the solid block, leaving at least a portion of the top surface exposed. Alternatively (not shown), sheet 25 can be sized with extra area around each side of pan 20 so that extra sheet 25 area can be folded over the top of the filled pan 20, also covering the top surface of the sealant 10 in addition to all surfaces inside the pan 20. Sheet 25 protects sealant 10 from being exposed to the elements during transport and before use on the job site and allows easy handling of the sealant 10 for transport and placement into a melting kettle on the job site, all without requiring bulky Styrofoam or other solid containers for the sealant 10.

After lined pan 20 is filled with liquid sealant material 10, filled pan 20 is cooled to solidify the sealant 10. The sealant is sufficiently cool enough to handle and stack in the range of about 120° F.-130° F. In a preferred embodiment, pan 20 is placed onto a steel belt which travels through a water bath for initial cooling. A chiller may be used to maintain water at a cold temperature. Pan 20 then undergoes additional cooling, such as by passing cold air over the sealant 10. In a preferred embodiment, pan 20 is placed in a wind tunnel, which pulls large volumes of air across the top of the sealant 10 filled pans 20. Alternative cooling methods may be used, any of which provide accelerated cooling of the liquid sealant 10 to a solid state.

Figure 4:
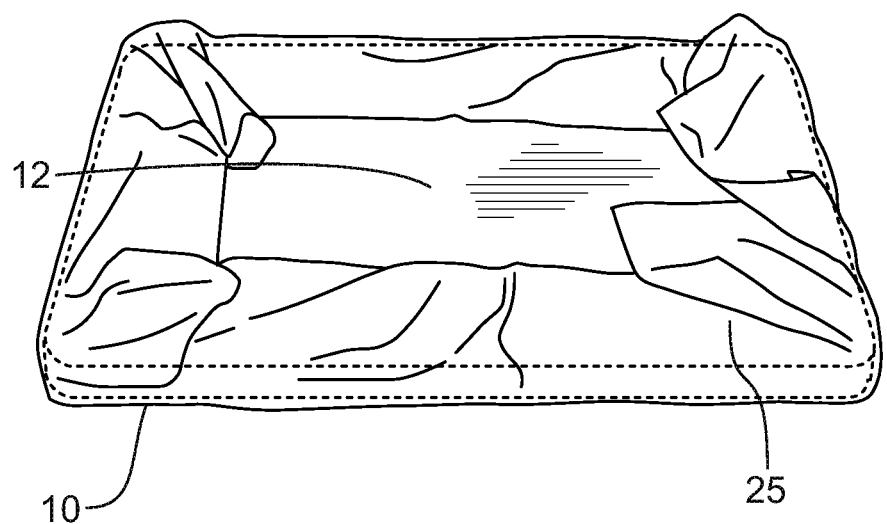
FIG. 4 is a top perspective view of a block of cooled sealant removed from container and covered with sheet in accordance with the present invention.

When sealant material is cooled to a solid state, a block 10 of sealant results with sheet 25 is adhered to the sides of the sealant block 10 and a portion of the top surface of the sealant block 10. As shown in FIG. 4, sealant block 10 covered with sheet 25 is then removed from the pan 20, the sealant block 10 now minimally packaged in the sheet 25 for easy handling, with the sheet 25 not requiring removal from the sealant block 10 before melting sealant block 10 in a kettle on the job site. In addition to providing packaging for the sealant block 10, the sheet 25 also acts a release liner, allowing easy removal of the sealant block 10 from the pan 20.

Figure 5:
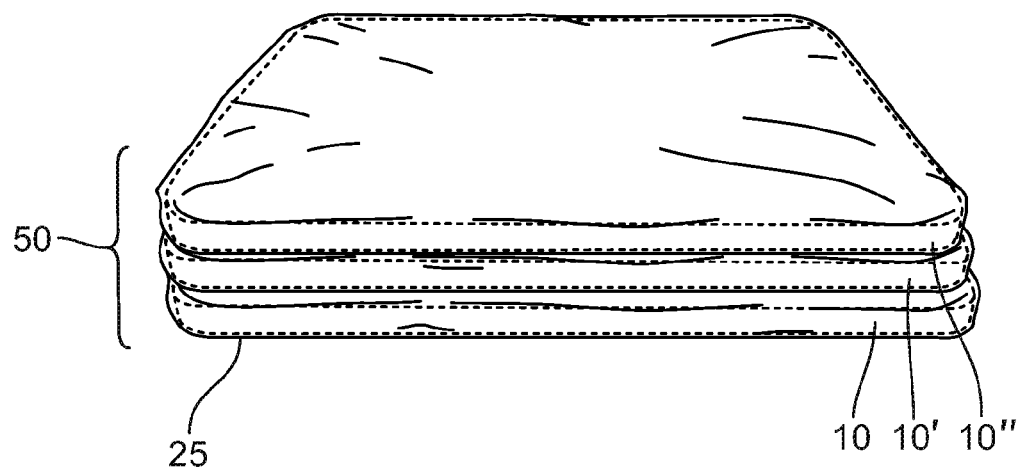
FIG. 5 is a top perspective view of three blocks of cooled sealant stacked together in accordance with the present invention.
Figure 6:
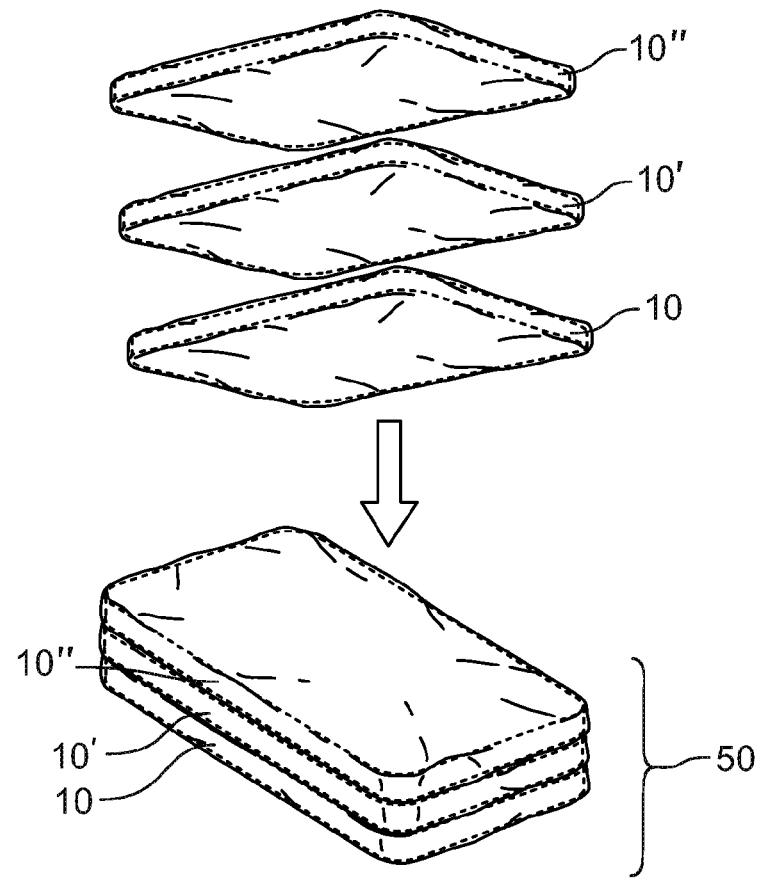
FIG. 6 is an exploded view showing three blocks of cooled sealant before and after stacking together in accordance with the present invention.

In a preferred embodiment shown in FIG. 4, when cooled sealant block 10 is removed from pan 20 sheet 25 covers all sides of sealant block 10 and a potion of top surface 12 of block 10. As seen in FIGS. 5 and 6, multiple covered sealant blocks 10 are then sealed together to form a self-sealed package 50 of two or more sealant blocks 10. As shown in FIG. 6, to create package 50, two or more contained sealant blocks 10, 10' and 10" are stacked together, with the at least partially uncovered surface 12 of two blocks 10 and 10' placed adjacent to one another, and the at least partially uncovered surface 12 of any additional blocks 10" placed on the bottom of the stack of two, forming a package 50 of two or more blocks 10, 10' and 10" self-sealed by sheets 25.

Figure 7:
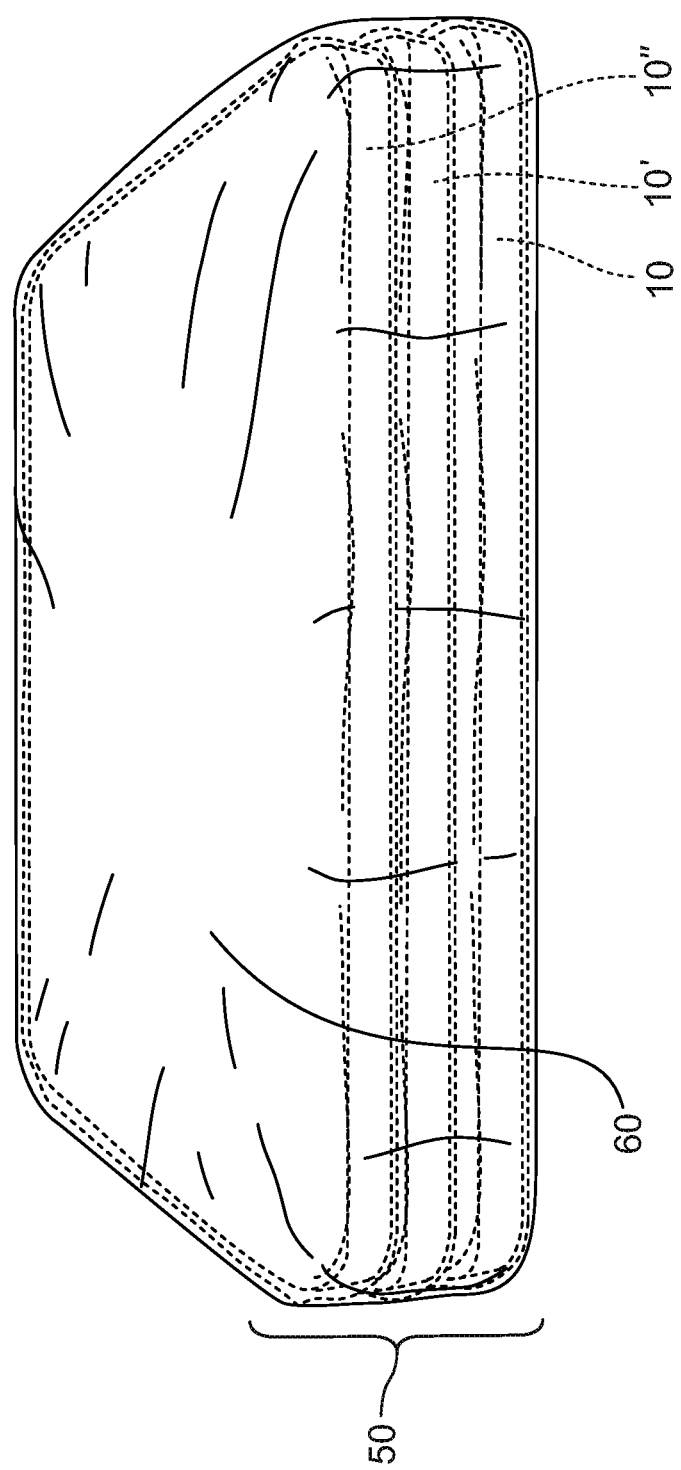
FIG. 7 is a top perspective view of three blocks of cooled sealant stacked together and wrapped in a film in accordance with the present invention.
Figure 8:
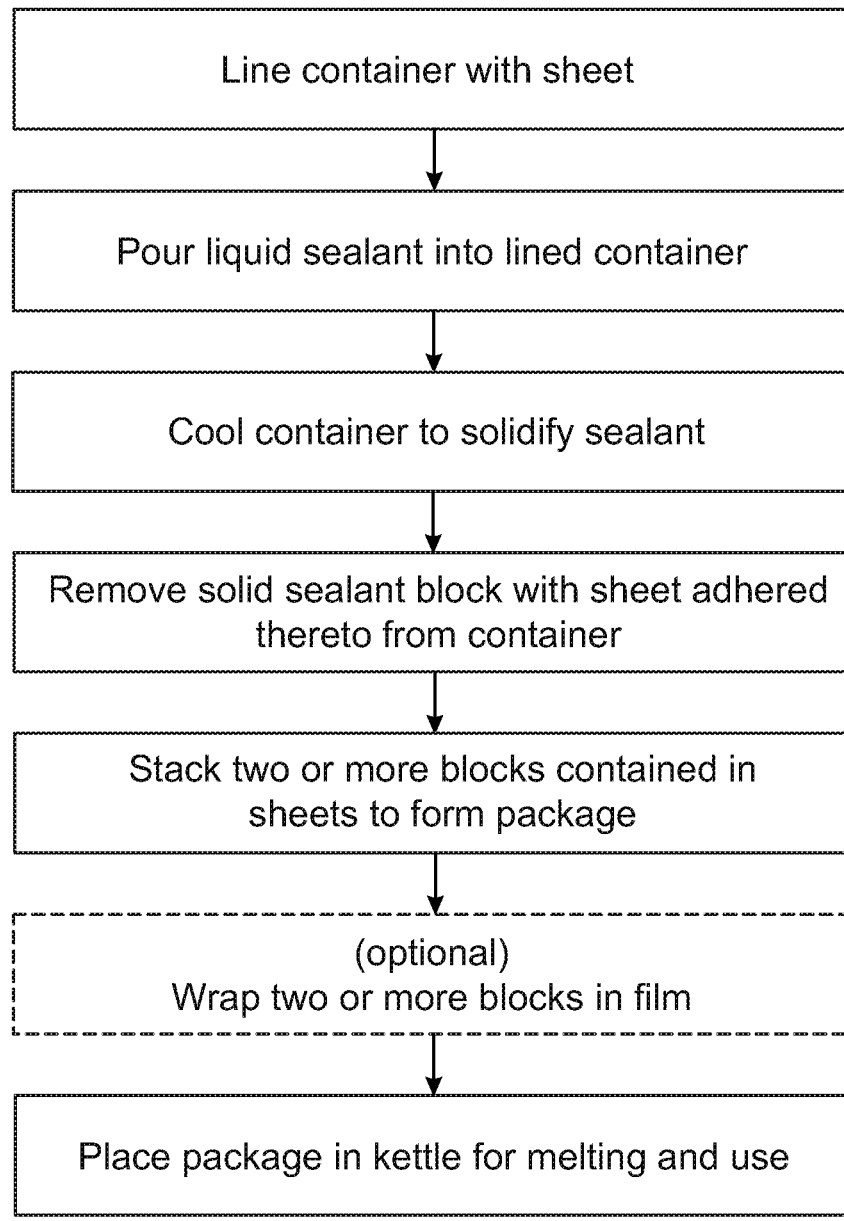
FIG. 8 is a flowchart illustrating a method of packaging a sealant product in accordance with the present invention.

As shown in FIG. 7, package 50 can optionally be further wrapped in a film 60 comprised of a material which mixes together with sealant material 10 and sheet 25 to become part of the end sealant product. This additional film 60 ensures a complete seal around package 50 for transport. In a preferred embodiment, self-sealed package 50 is placed in a shrink-wrap machine which wraps the package with film 60 comprised of plastic material. The shrink wrap helps give the pallet stability and weather proofs the sealant. FIG. 8 is a flowchart illustrating the above-described method of packaging a sealant product in accordance with the present invention.

Placing self-sealed package 50 of multiple blocks 10 into melting kettle has the key advantage of allowing sealant blocks 10 of package 50 to melt faster and more evenly than current systems which use one large sealant block. When package 50 is placed in and oil-jacketed melting kettle and heated to approximately 370° F., film 60, sheet 25 and sealant material 10 melt to form final sealant product. As sealant material 10 begins to melt, package 50 separates. Melted sealant migrates into the spaces between individual sealant blocks 10 and speeds up the melting process. This allows a greater surface area of the solid sealant material 10 to be exposed to hot liquid sealant more quickly, allowing package 50 to melt approximately two and a half times faster than traditional systems using one large block of sealant material. The use of multiple, smaller blocks 10 as opposed to one large block of material also allows blocks 10 to melt more evenly than melting one large block of material. When film 60, sheet 25 and sealant material 10 are melted to liquid form and mixed together, the final sealant product is removed from the kettle and placed into cracks or joints of asphalt or pavement.

In a preferred embodiment described above, where a sealant block 10 is dimensioned to weigh approximately 10 lbs, three individual sealant blocks 10 are stacked together to form a three-block package 50 weighing approximately 30 lbs. Packages 50 of this approximate size and weight fit into standard-sized melting kettles, and also allow for easy lifting of packages 50 from pallets or other means of transporting packages 50 for placement into melting kettles on site. However, also consistent with this invention are individual sealant blocks 50 formed in pans 20 with varying dimensions to result in sealant blocks 50 with varying sizes and weights. For example, packages of four blocks 10 weighing approximately 8 lbs each and with a total package 50 weight of approximately 32 lbs may be formed. Or, sealant blocks 10 and packages 50 of multiple blocks may be sized and packaged to accommodate varying sizes of kettles, or preferred package 50 dimensions and weights as desired by users.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A method for packaging a sealant product, the method comprising:
   providing a container configured to receive a volume of sealant product;
   lining said container with a sheet of material, said material being capable of ultimate integration into said sealant product and also being capable of adhering to said sealant product when said sealant product is cooled to a solid state;
   providing said volume of sealant product into said container lined with said sheet;
   cooling said volume of sealant product to a solidified sealant block;
   removing said sealant block and said sheet adhered thereto from said container to define a mostly encased sealant block wherein the adhered sheet encloses all surfaces of the sealant block except for an exposed portion of a top surface of the sealant block; and
   defining a self-sealed stack of sealant blocks by stacking two or more mostly encased sealant blocks together, said two or more mostly encased sealant blocks including a first mostly encased sealant block and a second mostly encased solidified sealant block, wherein said stacking includes placing the exposed portion of the first sealant block on the exposed portion of the second sealant block and positioning the second mostly encased sealant block on top of the first mostly encased sealant block.

2. The method of claim 1, wherein after said stacking, the exposed portion of the first mostly encased sealant block directly faces the exposed portion of the second mostly encased sealant block such that the exposed portion of the first mostly encased sealant block is directly adhered to the exposed portion of the second mostly encased sealant block.

3. The method of claim 2, wherein the self-sealed stack comprises a third mostly encased sealant block positioned below and supporting the first and second mostly encased sealant blocks, wherein the exposed portion of the third mostly encased sealant block is positioned on an unexposed portion of the first mostly encased sealant block and the exposed portion of the third mostly encased sealant block is directly adhered to a portion of the sheet that is adhered to and covering a bottom surface of the first mostly encased sealant block.

4. The method of claim 2, further comprising wrapping the self-sealed stack in a film to generate an encased package.

5. The method of claim 4, wherein the film surrounds and covers all sides of the self-sealed stack.

6. The method of claim 5, wherein the encased package is arranged such that each of the solidified sealant blocks of the self-sealed stack is separated from the film by at least one of the sheets.

7. The method of claim 6, further comprising inserting the encased package as a single unit into a kettle, wherein heat from the kettle integrates together the film, the sheets and the sealant blocks into a melted sealant product.

8. The method of claim 7, wherein directly prior to wrapping the self-sealed stack in the film, no portion of any sealant product of any said solidified sealant block is exposed to ambient atmosphere.

9. The method of claim 1, further comprising placing the self-sealed stack, as a single unit, in a kettle.

10. A method for packaging a sealant product, the method comprising:
   providing a container configured to receive a volume of sealant product;
   lining said container with a sheet of material, said material having a composition suitable for integration into said sealant product and also capable of adhering to said sealant product when said sealant product is cooled to a solid state;
   providing said volume of sealant product into said container lined with said sheet;
   cooling said volume of sealant product to a solidified sealant block;
   removing said solidified sealant block and said sheet adhered thereto from said container;
   stacking two or more solidified sealant blocks together to form a package of sealant blocks and adhering sheets, wherein said package is adapted for placement into a kettle for melting said package to form a melted sealant product;
   wrapping said package in a film, said film having a composition suitable for integration into said melted sealant product; and
   heating said wrapped package in said kettle to melt said two or more solidified sealant blocks, sheets, and film into a liquid state for use as a melted sealant product, said sheets and said film being integrated into said melted sealant product;
   wherein the two or more sealant blocks include a first sealant block with a first sheet adhered thereto and a second sealant block with a second sheet adhered thereto;
   wherein prior to stacking the two or more sealant blocks together, the first sheet is arranged to expose a portion of the first sealant block and the second sheet is arranged to expose a portion of the second sealant block;
   wherein the step of stacking said two or more sealant blocks and sheets adhered thereto includes defining a self-sealed stack of said two or more sealant blocks by placing the exposed portion of the first sealant block on the exposed portion of the second sealant block.

11. The method of claim 10, wherein said wrapped package is fully encased by said film after the step of wrapping said package in said film.

12. The method of claim 10, wherein said package weighs approximately thirty pounds.

13. The method of claim 10, wherein after stacking the two or more sealant blocks together, the exposed portion of the first sealant block directly faces the exposed portion of the second sealant block such that the exposed portion of the first sealant block is directly adjacent to and in direct physical contact with the exposed portion of the second sealant block.

14. The method of claim 10, wherein said film envelops the package and wherein each of the sealant blocks is fully separated from the film by at least one of the sheets.

15. The method of claim 14, wherein the wrapped package comprises multiple rows of sealant blocks, but only a single column of sealant blocks.

16. The method of claim 15, wherein upon stacking, each of the sheets comprises a closed and complete outer perimeter, and wherein the entire closed and complete outer perimeter of each sheet is directly adjacent to the film.

17. A method for packaging a sealant product, the method comprising:
   providing a container configured to receive a volume of sealant product;
   lining the container with a sheet of material, wherein the material is capable of ultimate integration into the sealant product, and wherein the material is capable of adhering to the sealant product when the sealant product is cooled to a solid state;
   providing the volume of sealant product into the container lined with the sheet;
   cooling the volume of sealant product to a solidified sealant block with the sheet adhered thereto;
   removing the solidified sealant block together with the sheet adhered thereto from the container, wherein the adhered sheet surrounds the solidified block on all sides except for an exposed portion on a top side of the solidified sealant block to define a mostly encased sealant block;
   defining a self-sealed stack at least by stacking two or more mostly encased sealant blocks together with the exposed portion of a second mostly encased sealant block directly on the exposed portion of a first mostly encased sealant block, wherein the second mostly encased sealant block lies on top of the first mostly encased sealant block; and
   completely encasing the self-sealed stack in a film to define an encased package, wherein the film and the adhered sheets are configured to mix together with the solidified sealant blocks when the encased package is heated to a liquid state in a kettle,
   wherein, when heated in the kettle, the encased package is configured to split apart to enable migration of the melted sealant product into spaces between the first and second mostly encased self-sealed sealant blocks to quickly liquefy the first and second mostly encased self-sealed sealant blocks.

18. The method of claim 17, wherein the self-sealed stack comprises
   a third mostly encased self-sealed sealant block positioned below the first mostly encased self-sealed sealant block, wherein the exposed portion on the top surface of the third mostly encased self-sealed sealant block is positioned against a bottom, unexposed surface of the first mostly encased self-sealed sealant block.

19. The method of claim 18, further comprising inserting the encased package, as a unit, into a kettle, which integrates the sheets, the film, and the volumes of sealant product into a melted sealant product.

* * * * *